United States Patent [19]

Diggs

[11] 3,911,336
[45] Oct. 7, 1975

[54] PLURAL MOTOR DRIVE INCLUDING A SERVO MOTOR CONTROL SYSTEM

[76] Inventor: Thomas M. Diggs, 1349 Otis St. NW, Washington, D.C. 20017

[22] Filed: Feb. 1, 1974

[21] Appl. No.: 438,642

[52] U.S. Cl. .................. 318/48; 318/16; 318/623; 318/625; 318/675; 318/8
[51] Int. Cl.² ................................. H02P 5/46
[58] Field of Search .......... 318/8, 16, 48, 623, 614, 318/625, 675

[56] References Cited
UNITED STATES PATENTS

| | | | |
|---|---|---|---|
| 1,589,673 | 6/1926 | Winter | 318/675 |
| 1,883,163 | 10/1932 | Van Voorhes, Jr. | 318/675 |
| 1,996,055 | 4/1935 | Boycow | 318/623 |
| 2,344,352 | 3/1944 | Graham | 318/675 X |
| 2,413,739 | 1/1947 | White | 318/623 |
| 2,526,233 | 10/1950 | Hirsch | 318/625 |
| 2,717,344 | 9/1955 | Jackson | 318/675 |
| 2,958,024 | 10/1960 | Solis | 318/675 X |
| 3,020,457 | 2/1962 | Kelley | 318/675 X |
| 3,164,763 | 1/1965 | Kelley | 318/675 X |
| 3,395,323 | 7/1968 | Peters | 318/675 |

*Primary Examiner*—T. E. Lynch
*Attorney, Agent, or Firm*—Victor J. Evans & Co.

[57] ABSTRACT

The present invention relates to a servo motor control system in which an electric motor is instantaneously energized by movement of a relatively weak servo motor of the type normally actuated by radio controls in a radio control model. The electric control motor is controlled in forward and reverse rotation and drives one element of a switch controlling the motor with the other element being driven by the servo motor.

5 Claims, 7 Drawing Figures

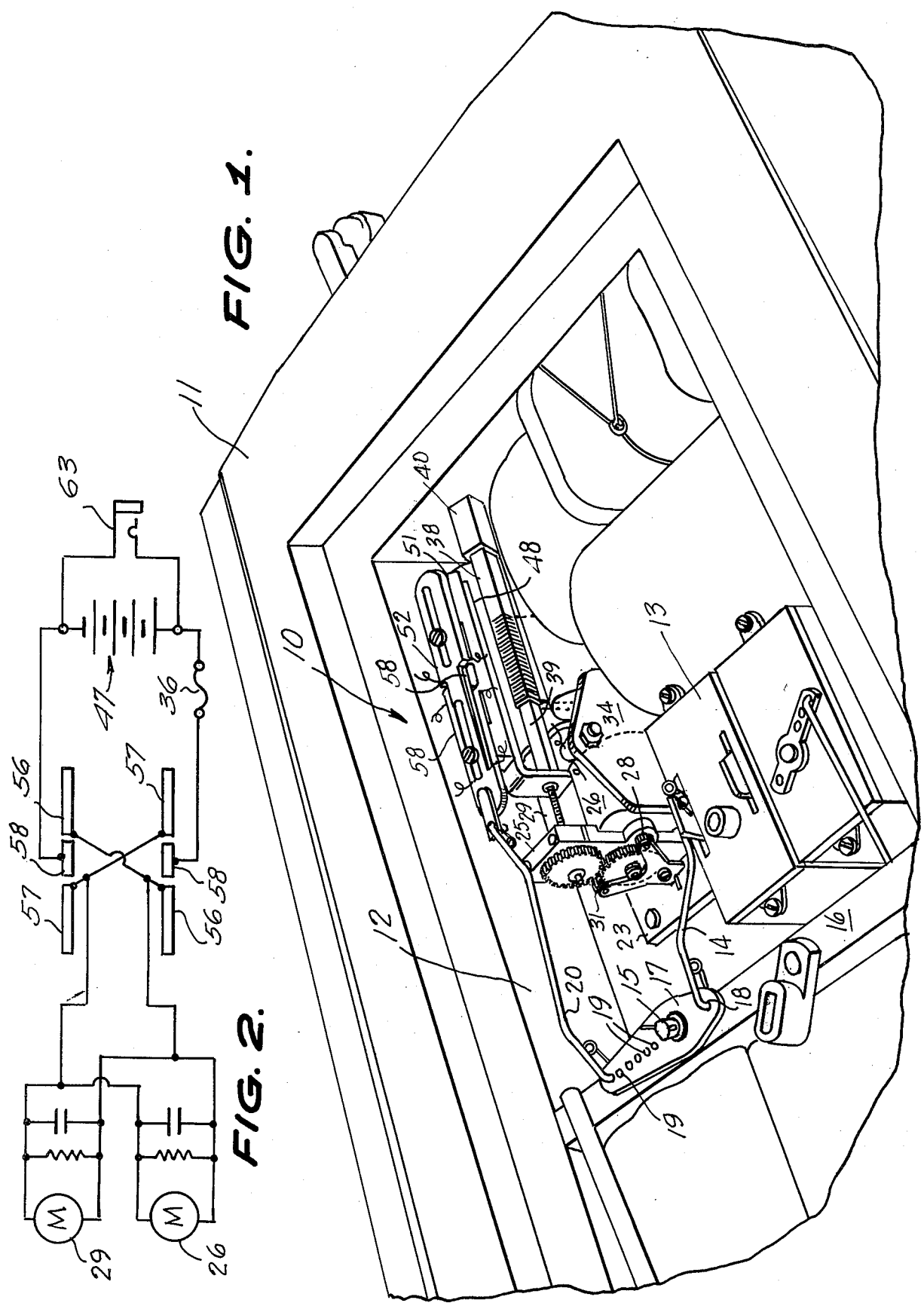

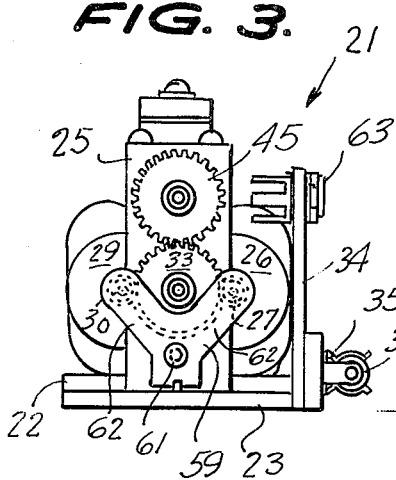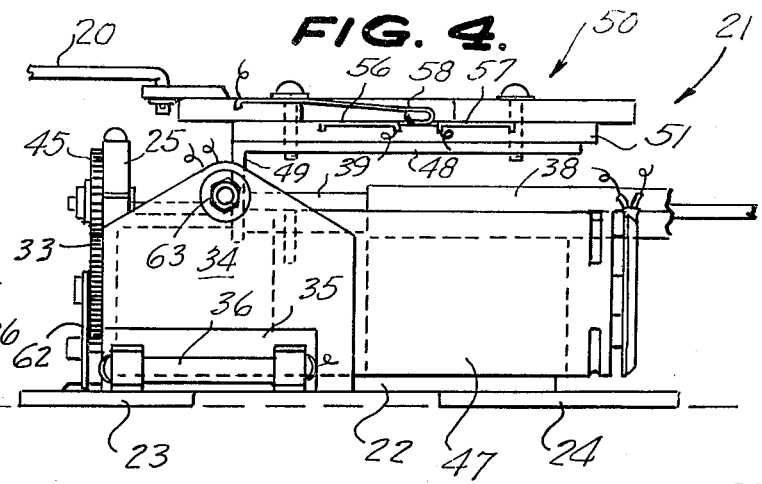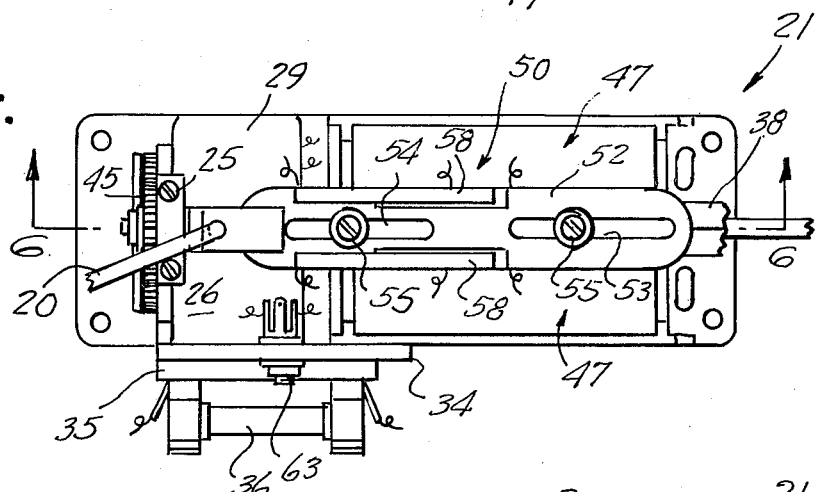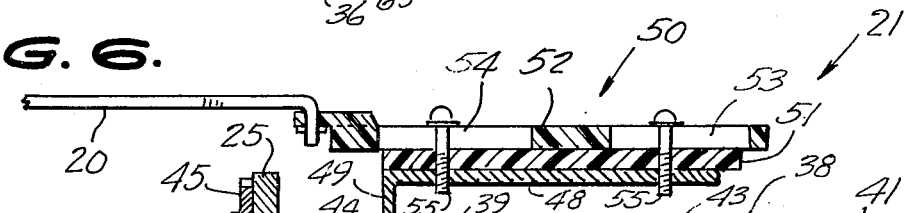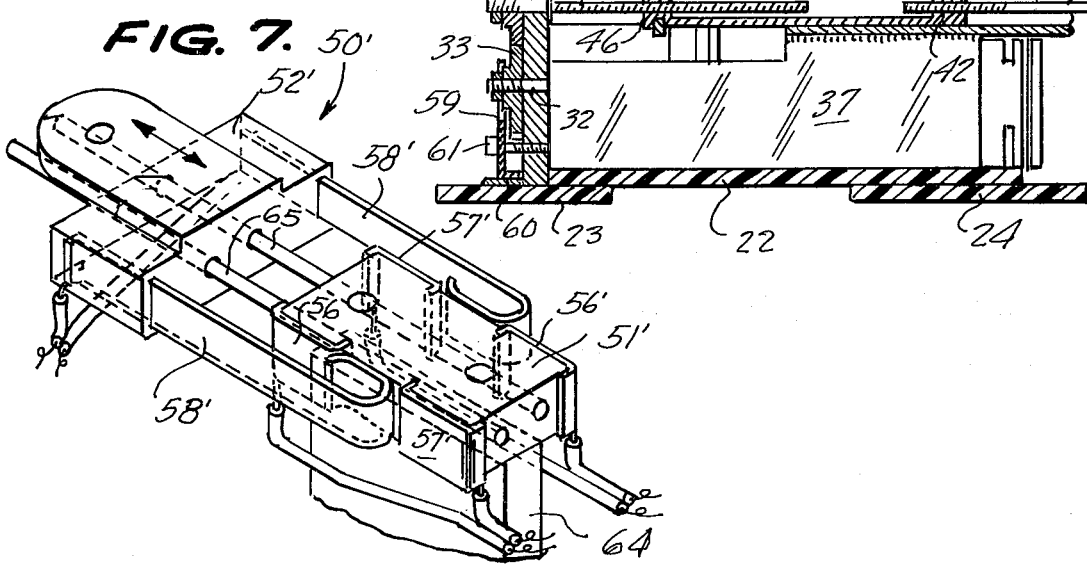

3,911,336

PLURAL MOTOR DRIVE INCLUDING A SERVO MOTOR CONTROL SYSTEM

BACKGROUND OF THE INVENTION

1. Field of the Invention

The present invention relates to servo control systems of the type used in radio control models.

2. Summary of the Invention

The present invention provides an electric motor drive for controlled elements of a model with the electric motor being controlled by a radio actuated servo motor through a switch having one element driven by the electric motor and the other element driven by the servo motor.

The primary object of the invention is to provide an electric motor power unit in a servo motor control system to multiply the force available from the system.

Other objects and advantages will become apparent in the following specification when considered in light of the attached drawings.

BRIEF DESCRIPTION OF THE DRAWINGS

FIG. 1 is a perspective view of the invention shown mounted in a model boat;

FIG. 2 is a circuit diagram of the control circuit of the invention;

FIG. 3 is a front elevation of the invention;

FIG. 4 is a side elevation of the invention;

FIG. 5 is a top plan view of the invention;

FIG. 6 is a vertical sectional view taken along the line 6—6 of FIG. 5, looking in the direction of the arrows; and FIG. 7 is a perspective view of a modified switch used with the invention.

DESCRIPTION OF THE PREFERRED EMBODIMENT

Referring now to the drawings in detail, wherein like reference characters indicate like parts throughout the several figures, the reference numeral 10 indicates generally a servo motor control system constructed in accordance with the invention.

The servo motor control system 10 is shown installed on a model boat 11 within a compartment 12 thereof. A conventional radio controlled servo motor 13 is mounted in the compartment 12 and has a link 14 attached thereto for reasons to be assigned. A post 15 is mounted in upright relation on a transverse bulkhead 16 of the boat 11 and has a lever 17 mounted thereon for pivotal movement. The lever 17 has an aperture 18 adjacent one end thereof to which the link 14 is connected for pivotal movement therein. A plurality of spaced apertures 19 are formed in the opposite end of the lever 17 to receive one end of a link 20 in anyone of a number of adjusted positions. Normal actuation of the servo motor 13 will cause the link 14 to move in a direction to pivot the lever 17 about the post 15 and to cause the link 20 to move fore and aft in the boat 11.

The motor drive is generally indicated by the reference numeral 21 and includes a generally horizontal base 22 supported on a pair of base plates 23, 24 as can be clearly seen in FIG. 6. An upright frame 25 is rigidly secured to the base 22 and the base plate 23 for reasons to be assigned.

An electric motor 26 is supported on the frame 25 and has a shaft 27 which extends forwardly through the frame 25 carrying a spur gear 28 on its outer end. An electric motor 29 is mounted on the frame 25 and has a shaft 30 extending through the frame carrying a spur gear 31 on its outer end. A stud shaft 32 is mounted on the frame 25 and extends forwardly having a spur gear 33 journalled on its outer end. The spur gear 33 meshes with the spur gears 28, 31 as can be seen in FIG. 1. The electric motor 26 and the electric motor 29 are adapted to drive the spur gear 33 in either direction simultaneously.

A panel 34 extends upwardly from the base 22 and is rigidly secured thereto. A fuse holder 35 is mounted on the panel 34 and has a fuse 36 arranged therein for reasons to be assigned. A central plate 37 extends uprightly from the base 22 and is secured at its forward end to the frame 25.

The plate 37 has a square tube 38 secured to its upper edge with the tube 38 arranged in generally horizontal position. A square tube 39 is telescopically mounted in the tube 38 and is adapted to slide freely therein. A square tube 40 is mounted in the transom of the boat 11 and extends therethrough with the square tube 38 telescoping therein and sealed thereto.

A drive link 41 is secured to the square tube 39 by means of a threaded end portion 42 which threads into the closed end portion 43 of the tube 39. The drive link 41 extends to a rudder (not shown) in a normal position on the rear of the boat 11. A threaded shaft 44 is journalled in the frame 25 and has a spur gear 45 secured to its outer end meshing with the spur gear 33. The threaded shaft 44 is threaded through a closed end portion 46 on the square tube 39 opposite the closed end portion 43 so as to drive the tube 39 longitudinally when the threaded shaft 44 is rotated in either direction.

A pair of battery packs 47 are secured to opposite sides of the plate 37 to provide electricity for operation of the motors 26, 29.

A support plate 48 has a depending flange 49 integrally formed on one end thereon. The flange 49 is rigidly secured to the closed end portion 46 of the tube 39 with the support plate 48 extending generally parallel to the tube 39. A motor control switch generally indicated at 50 is mounted on the support plate 48 and includes a bar 51 formed of electrical insulating material and having a generally flat switch element 52 slidably mounted thereon. The switch element 52 is connected at its forward end to the rear end of the link 20 as can be seen in FIGS. 1, 4, 5 and 6.

The switch element 52 has an elongate slot 53 adjacent one end thereof and an elongate slot 54 adjacent the other end thereof. Screws 55 extend downwardly through the slots 53, 54 through the insulating bar 51 into the support plate 48 securing the switch 50 to the support plate 48 and mounting the switch element 52 for sliding movement with respect to the bar 51. A pair of contact members 56, 57 are mounted on each side of the bar 51 in spaced apart relation as can be seen in FIG. 4. A spring contact bar 58 is mounted on each side of the switch element 52 and extends downwardly to a level to contact a contact member 56, 57 as the switch element 52 moves in either longitudinal direction with respect to the bar 51. As the servo motor 13 is actuated the link 14 swings the lever 17 and thus the link 20 to move the switch element 52 and cause the spring contact members 58 to come in contact with a contact member 56 on one side and 57 on the opposite side to energize both motors 26, 29 for rotation in a selected direction and thus drive the screw shaft 44 moving the square tube 39 longitudinally. The square tube 39 carries the switch bar 51 and the link 41 therewith. The rudder (not shown) is thus moved in a desired direction as the square tube 39 moves and the insulated bar 51 moves a corresponding amount until the spring contact elements 58 move out of contact with the contact members 56, 57 to thus stop the motors 26, 29. Thus it can be seen that each time the switch element 52 is moved by the servo motor 13 the square tube 39 will move a corresponding amount until the spring contacts 58 have reached a central position between the contact elements 56, 57.

A yoke 59 engages a block 60 at its lower end and is secured to the frame 25 with an adjustable screw 61. Spaced arms 62 of the yoke 59 engage against the shafts 27, 30 respectively and apply pressure thereto controlling the speed of operation of the motors 26, 29. The screw 61 can be tightened to increase the friction on the shafts 27, 30 and thus decrease the motor speed even further. The friction pressure on the shafts 27, 30 vertially eliminates "hunting" by the motors 26, 29.

A socket 63 is mounted on the panel 34 and is wired in series with the battery 47. A battery tester and/or a battery charger can be plugged into the socket 63 to test the voltage and recharge the batteries 47.

In FIG. 7 a modified switch 50' is illustrated and can be used to replace the switch 50 when desired. The switch 50' includes a support 64 which is adapted to be secured to the support 48 illustrated in FIG. 6. A block 51' is secured to the support 64 and has a pair of spaced parallel rods 65 extending horizontally outwardly from one end thereof. The block 51' is formed of electrical insulating material and has a pair of spaced apart contact elements 56', 57' secured to the opposite side faces thereof. A switch element 52' is mounted for sliding movement on the rods 65 and is adapted to be connected to the link 20 to slide the switch element 52' longitudinally with respect to the block 51'. Opposed spring contact members 58' extend generally parallel outwardly from the switch element 52' and resiliently engage the opposite sides of the block 51' so as to alternately engage the contacts 56', 57' as the switch element 52' is moved on the rod 65. The switch 50' by having its spring contact members 58' in opposed relation produces a more positive contact between the contact members 58' and the contact elements 56', 57'. The switch 50' is wired into the control system circuit in exactly the same manner as the switch 50 and operates the same.

Having thus described the preferred embodiment of the invention it should be understood that numerous structural modifications and adaptations may be resorted to without departing from the spirit of the invention.

What is claimed is:

1. A servo motor control system comprising a reversable electric motor drive, longitudinally reciprocating means driven by said electric motor drive for connection to an object to be move, a first switch element mounted on said means and moveable longitudinally therewith, a servo motor control member mounted on said means and longitudinally moveable with respect to said means, a second switch element mounted on said motor control member for movement therewith, at least one of said switch elements having a pair of longitudinally spaced contacts and the other of said switch elements having a contact for selective engagement with said space contacts and means extending from said switch elements for energizing a forward or reverse circuit to said electric motor drive corresponding to the movement of said servo motor control.

2. A device as claimed in claim 1 wherein the contact of the other of said switch elements is spring urged into contacting relation with said pair of contacts.

3. A device as claimed in claim 2 including two of said spring urged contacts arranged in spaced apart opposed relation and two of said spaced pair of contacts with each of said spring urged contacts cooperating with one of said spaced pair of contacts.

4. A device as claimed in claim 1 wherein said reversable electric motor drive includes a pair of operating simultaneously motors.

5. A device as claimed in claim 1 including means in said electric motor drive for frictionally retarding the speed of said electric motor drive.

* * * * *